Patented Jan. 10, 1950

2,493,765

UNITED STATES PATENT OFFICE 2,493,765

MODIFICATION OF AND SHRINKPROOFING OF WOOLS WITH AMINES

George C. Le Compte, Arlington, Va.

No Drawing. Application December 5, 1947, Serial No. 790,006

7 Claims. (Cl. 8—127.6)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to me of any royalty thereon.

This invention relates to the production of wools of markedly altered properties with respect to their resistance to shrinking, increased strength, and resistance to damage by natural organisms.

An object of this invention is to treat wool with amines in such manner as to favorably affect its properties.

A further object of this invention is to treat wool with amines to yield a modified wool of increased strength, and completely shrinkproof, or substantially so, by treating with anhydrous amines preferably, or solutions of 50 or 75%, or higher, concentration.

Another object is to treat wool with amines to yield a series of modified wools ranging in properties from shrinkproof fibers of increased strength to wool fibers so modified as to constitute new fibers, some of which are soluble in cold water.

Other objects will be obvious from the following disclosure.

In the following examples morpholine, diethanolamine and triethanolamine are the amines employed. The invention is not limited thereto. Among others that may be used are mono-ethanolamine, diethylenetriamine, triethylene-tetramine, tetraethylenepentamine, or the condensation products of these amines, or those of the examples, with bi- or poly-functional compounds such as dibasic acids, for example, sebacic or azelaic, or dihalides such as penta- or hexamethylene-dibromide. Primary, secondary, and tertiary amines may be employed.

Example 1

Wool is soaked in a 10–12% solution of diethanolamine in water, the excess reagent drained from the wool, and the impregnated wool heated in a drying oven at about 150° C. for 30 minutes to dry the wool and bake it.

In the above example a 25–30% solution of triethanolamine in water was substituted for the solution of diethanolamine.

Like concentrations of morpoline in water may also be applied to the wool in the same manner.

The impregnated wool may, alternatively, be dried at 50°–60° C. in a current of air and then baked in the drying oven at 100° C. or higher, preferably at 105° to 110° C., for about four minutes. High temperatures known to damage wool should be avoided. Consequently, I prefer temperatures no higher than 160° C., unless the duration of treatment is made very short.

During the drying step of Example 1 water is driven off. Consequently, the wool is, in effect, treated with the resulting anhydrous, or highly concentrated, amine at the temperature of the drying oven.

The draining of the amine from the wool can be standardized to leave the pre-determined amount required to produce the desired product and the desired completeness of reaction.

Other volatile solvents may be used in place of the water.

The condensation products described above may be best applied to the wool as solutions in phenol, cresol, ethylene glycol, or glycerine.

Example 2

Wool was immersed in aqueous solutions of triethanolamine having the concentrations listed in the first column of the table shown below. The procedure employed was that of Example 1. The impregnated wool was removed from the solution, the excess amine drained off, and the wool then submitted to drying and baking in an oven, at about 150° C. for 30 minutes. The shrinkage of each sample was then determined by a standard test which corresponded to a very severe home laundering operation. The first sample, with zero percent triethanolamine, is the control, for comparison.

| Triethanolamine | Shrinkage |
|---|---|
| Per cent | Per cent |
| 0 | 27.6 |
| 5 | 21.0 |
| 10 | 16.3 |
| 15 | 9.6 |
| 20 | 4.6 |
| 25 | 0.3 |
| 30 | −0.6 |

The sample impregnated with 30 percent aqueous triethanolamine did not shrink, in fact it stretched 0.6 percent.

Example 3

Wool was immersed in a bath of the anhydrous amine and kept in the bath for a period of time ranging from 5 to 30 minutes or more, at 90–110° C. With anhydrous triethanolamine and heating at 90° C. a completely shrinkproof wool may be obtained in 5 to 10 minutes.

Wool was treated by this method in a bath of anhydrous morpholine maintained at 90°, and another sample at 100° C., for 30 minutes. This resulted in a shrinkproofing much more effective than that obtained by heating a sample in a bath of 10 percent aqueous morpholine at 40°, and another sample at 60° C., for 30 minutes.

Other anhydrous amines may be employed in this example, for instance, anhydrous diethanolamine and monoethanolamine.

In Example 3 the wool was treated with an excess of the anhydrous amine, since it was heated while immersed therein.

In Examples 1 and 2, the amount of amine present on the wool being heated is determined by the concentration of the impregnating solution and the manner of draining or squeezing the wool to remove excess amine.

In Example 3 shrinkage reduction may be obtained with aqueous amine having concentrations of 50 or 75 per cent. Non-aqueous solvents may also be employed.

Having thus described my invention, I claim:

1. A process for shrinkproofing wool comprising heating wool in a bath of 100% morpholine at a temperature of 90–110° C., for 5 to 30 minutes.

2. A process for shrinkproofing wool comprising heating wool impregnated with a material essentially consisting of anhydrous morpholine at a temperature of 90° C. and above for five to thirty minutes.

3. A process for shrinkproofing wool comprising heating wool immersed in a bath essentially consisting of anhydrous morpholine at a temperature of about 90° to 110° C. for five to thirty minutes.

4. A process for modifying wool comprising heating wool impregnated with a basic material essentially consisting of morpholine at a temperature of 90° C. and above, the morpholine being applied to the wool in a solution having a concentration no lower than 50 percent, the said heating being for about five to thirty minutes.

5. A process for shrinkproofing wool comprising heating wool impregnated with a material consisting of a compound taken from the group consisting of 100 percent, anhydrous ethanolamines and morpholine at a temperature of 90° C. and above, the said heating being for no longer than about thirty minutes.

6. The process of claim 5 in which the material is diethanolamine and the temperature is no higher than about 110° C.

7. The process of claim 5 in which the material is triethanolamine and the temperature is no higher than about 110° C.

GEORGE C. LE COMPTE.

REFERENCES CITED

The following references are of record in the file of this patent:

UNITED STATES PATENTS

| Number | Name | Date |
|---|---|---|
| 2,250,930 | Evans | July 29, 1941 |
| 2,257,088 | Bruson | Sept. 30, 1941 |
| 2,382,632 | Hessel | Aug. 14, 1945 |

FOREIGN PATENTS

| Number | Country | Date |
|---|---|---|
| 538,396 | Great Britain | Aug. 1, 1941 |
| 538,428 | Great Britain | Aug. 1, 1941 |